US005968445A

United States Patent [19]

McCarville et al.

[11] Patent Number: 5,968,445

[45] Date of Patent: Oct. 19, 1999

[54] METHOD AND APPARATUS FOR CURING LARGE COMPOSITE PANELS

[75] Inventors: Douglas A. McCarville, Auburn; David F. Taylor, Kent, both of Wash.

[73] Assignee: The Boeing Company, Seattle, Wash.

[21] Appl. No.: 09/002,685

[22] Filed: Jan. 5, 1998

[51] Int. Cl.[6] .................... B29C 70/44

[52] U.S. Cl. .................... 264/571; 156/285; 156/382; 264/102; 425/389; 425/405.1

[58] Field of Search .................... 425/389, 405.1; 264/510, 571, 102; 156/285, 286, 382

[56] References Cited

U.S. PATENT DOCUMENTS

| | | | |
|---|---|---|---|
| 2,354,916 | 8/1944 | Hurt | 264/571 |
| 2,392,108 | 1/1946 | Vidal et al. | 425/389 |
| 3,666,600 | 5/1972 | Yoshino | 156/382 |
| 3,703,422 | 11/1972 | Yoshino | 156/286 |
| 4,622,091 | 11/1986 | Letterman | 264/510 |
| 4,765,942 | 8/1988 | Christensen et al. | 264/510 |
| 4,869,770 | 9/1989 | Christensen et al. | 156/382 |
| 4,915,896 | 4/1990 | Rachal | 264/571 |
| 4,942,013 | 7/1990 | Palmer et al. | 156/285 |
| 4,963,215 | 10/1990 | Ayers | 156/286 |
| 5,052,906 | 10/1991 | Seemann | 425/389 |
| 5,261,993 | 11/1993 | Dahlgren | 156/382 |
| 5,338,177 | 8/1994 | Le Touche | 425/389 |
| 5,447,668 | 9/1995 | Delangis | 425/389 |
| 5,487,864 | 1/1996 | Bartilucci et al. | 425/508 |
| 5,576,030 | 11/1996 | Hooper | 425/389 |
| 5,593,633 | 1/1997 | Dull et al. | 264/510 |
| 5,709,893 | 1/1998 | McCarville et al. | 425/389 |

FOREIGN PATENT DOCUMENTS

| | | | |
|---|---|---|---|
| 121065 | 2/1946 | Australia | 156/382 |

OTHER PUBLICATIONS

A.W. Alteneder et al., *Processing and Characterization Studies of Honeycomb Composite Structures*, Proc. 38th Int'l. SAMPE Symp./Exhib. (May 10–13, 1993).

*Primary Examiner*—Robert Davis

*Attorney, Agent, or Firm*—Christensen O'Connor Johnson and Kindness PLLC

[57] ABSTRACT

A method and apparatus for curing large composite parts. The method utilizes a fiber metal mesh sheet (40) situated against a composite material(34) during a curing process. The fiber metal mesh sheet (40) provides a porous network for flow of the reaction by-products during a curing and vacuuming process, yet gives adequate structure to prevent both mark-off by vacuum ports (52, 70) and crushing of the porous network as a result of autoclave and vacuum pressure. External vacuum ports (52) are located in a bagging film (50) surrounding the composite material (34). Alternatively, vacuum ports (70) are located below the composite material (34). The use of the external vacuum ports (52), vacuum ports (70) located beneath the composite material (34), or both, shortens by-product flow path and provides adequate vacuum pressure over all areas of the composite material (34) to remove reaction by-products.

16 Claims, 5 Drawing Sheets

METHOD AND APPARATUS FOR CURING LARGE COMPOSITE PANELS

TECHNICAL FIELD

This invention is directed to composites and, more specifically, a method and apparatus for curing a large composite part.

BACKGROUND OF THE INVENTION

Airplane manufacturers are under increasing pressure to produce lightweight, strong, and durable aircraft at the lowest cost for manufacture and life cycle maintenance. An airplane must have sufficient structural strength to withstand stresses during flight, while being as light as possible to maximize the performance of the airplane. For these reasons and others, aircraft manufacturers have increasingly used fiber-reinforced resin matrix composites.

Fiber-reinforced resin matrix composites provide improved strength, fatigue resistance, stiffness, and strength-to-weight ratio by incorporating strong, stiff, carbon fibers into a softer, more ductile resin matrix. The resin matrix material transmits forces to the fibers and provides ductility and toughness, while the fibers carry most of the applied force. Unidirectional continuous fibers can produce anisotropic properties, while woven fabrics produce quasi-isotropic properties.

In one prior art method of producing fiber-reinforced resin matrix components for aircraft, a number of prepreg sheets were stacked on a lay-up mandrel. An example of such a process is disclosed in U.S. Pat. No. 4,765,942, incorporated herein by reference. The lay-up mandrel included internal plumbing extending to a number of vacuum ports at the upper surface of the lay-up mandrel. The vacuum ports were located on a circumference that extended a few inches outside the perimeter of the prepreg sheets located on the lay-up mandrel.

A parting film, such as fluorinated ethylene propylene (FEP), was applied over the stack of prepreg sheets. A flexible, fiberglass breathable blanket was placed over the top of the parting film. The breathable blanket was larger than the prepreg sheets so that it contacted the vacuum ports at the surface of the lay-up mandrel. A vacuum bag was placed over and sealed around the entire structure, and the lay-up mandrel was placed in an autoclave and the prepreg sheets were cured.

During curing, vacuum was applied to the bag and the autoclave was pressurized so as to compact the prepreg sheets onto the upper surface of the lay-up mandrel. After the curing process was complete, the compacted and cured composite part was removed from the lay-up mandrel.

The curing process described above was not successful in formation of high quality, large thermoplastic composite parts. The prepreg sheets used in formation of thermoplastic composite parts were "wetted," or soaked with solvents, to carry the resin onto the fibers and create a tack similar to conventional thermoset composite prepreg sheets. The introduction of solvents into the prepreg sheets required that the solvent, as well as a number of other by-products of the curing process, such as ethanol, water, and volatiles (typically 15% by weight), be removed before and during the curing process to form a high quality composite part. The by-products may evolve during the heating or curing cycles, can be a residual solvent carried in the material, or can be produced as a result of the condensation and curing reactions that occur at elevated temperatures to convert the resin to a composite. The by-products can include water, solvents, and volatiles that are emitted by the resin during curing of composite material. The volatiles include organics that are the residue of protecting groups on the capping compounds of the monomer reactants of the resin, and organics that are emitted from the capping compounds when the capping compounds release their protective groups and react.

In prior art processes, the removal of by-products of the curing process was facilitated via the vacuum ports distributed around the perimeter of the lay-up mandrel. The breathable blanket provided a flow path for the by-products during vacuum.

Past experience has demonstrated that high-quality small thermoplastic parts can be fabricated using the composite forming methods described above. However, in large parts, where the flow path from portions of the composite part to the vacuum ports was greater than 1.5 feet, pores (pockets where no resin is present around the fibers) were produced at portions of the part removed from the vacuum parts as a result of air, moisture, and other by-products not being drawn during the curing process. The pores caused a drop in strength of the composite part.

To remedy this problem, prior processes increased the number of vacuum ports around the part. The results were mixed, and the majority of prior art processes were not successful in the fabrication of parts that have a flow path to the vacuum ports from central portions of the part that was greater than 1.5 feet (i.e., a part that was greater than 3 feet across).

The prior art used staged heating to drive off the excess solvent prior to reaching the melt and cure temperatures where the capping compounds released their protecting groups and then reacted. Other prior art processes increased the time to draw the by-products off, both during the heat-up and the dwell of the cure cycle. It was assumed that given enough time, a sufficient amount of the by-products would be removed from the part. One process lengthened the dwell time from 2 hours to 8 hours. This modification in the cure cycle resulted in an increase of maximum by-product flow path from 1.5 feet to 3 feet. However, the increase in dwell time was insufficient for creating composite parts that were greater than 6 feet across. This limitation made it impossible to make large panels like wing skins.

Another attempt to cure large thermoplastic panels involved the use of a lay-up mandrel made of a porous material such as monolithic graphite. The porous material permitted the extraction of some by-products directly through the lay-up mandrel, or along the lay-up mandrel's surface. One problem with this approach was that the monolithic graphite had poor strength, resulting in the need for structural support for rigidity and handling. The combined weight produced an extremely heavy lay-up mandrel, which was difficult to handle in a factory. The monolithic graphite was also difficult to machine. In addition, monolithic graphite chipped and cracked easily, making it an impractical material for a production environment.

Thus, there exists a need for an improved method for making a large fiber-reinforced resin matrix composite part substantially free of pores.

SUMMARY OF THE INVENTION

The present invention is a method and apparatus for forming a composite part. The apparatus includes a lay-up mandrel for receiving uncured composite material, generally as prepreg sheets. A prepreg is a fiber-reinforced resin. The resin is wetted out of a varnish onto the fabric. The mandrel supports the composite material in the desired shape. Instead of prepreg, the lay-up might be unidirectional tape or may result from a SCRIMP process. The resin produces reaction by-products during a curing process. A porous structural spacer extends against the composite material located on the lay-up mandrel. The porous structural spacer includes a porous network and defines a structural strength. The porous network is sufficient to allow the flow of the reaction by-products. A bagging film extends substantially over the composite material and the porous structural spacer. The bagging film has a hole that is located above the composite material. A vacuum port covers the hole. The vacuum port is designed such that it permits the reaction by-products to flow from underneath the bagging film through the vacuum port. The structural strength of the porous structural spacer is sufficient so that the porous structural spacer substantially prevents both (1) mark-off by the vacuum port and (2) closing of the porous network as a result of pressure and vacuum being applied to the bagging film.

A plurality of vacuum ports located above the composite material make the egress path for by-product sufficiently short to permit fabrication of large area, porosity-free products from volatile-emitting resins, such as K3B. By "large area," we mean parts larger than 3 feet across.

A vacuum source located outside the bagging film draws reaction by-products from underneath the bagging film through the vacuum ports.

The vacuum ports typically are spaced in a regular array along the top of the composite material so that the by-product flow path to a vacuum port for all parts of the composite material does not exceed approximately 1.5 feet.

The porous structural spacer preferably is a fiber metal mesh sheet. In one preferred embodiment, it comprises a first fiber metal mesh sheet adjacent a second fiber metal mesh sheet. The first fiber metal mesh sheet is preferably located against the composite material and has a smooth surface finish. In one embodiment, the first fiber metal mesh sheet located against the composite material permits flow of reaction by-products through the filter, but blocks flow of resin material from the composite material during a curing process. The second fiber metal mesh sheet preferably extends against the first fiber metal mesh sheet and has a porous network sufficient to allow the flow of the reaction by-products in directions parallel to a surface of the second fiber metal mesh sheet.

In accordance with yet another aspect of the present invention, an apparatus for use in curing a composite part is provided. The apparatus includes a lay-up mandrel and a porous structural spacer extending against the lay-up mandrel. The porous structural spacer receives composite material, the composite material having a resin material and being capable of forming reaction by-products during a curing process. The porous structural spacer has a porous network and defines a structural strength, the porous network being sufficient to allow the flow of the reaction by-products. A bagging film extends substantially over the composite material and the porous structural spacer. A vacuum port extends to underneath the bagging film. The vacuum port is designed such that it permits the reaction by-products to flow from underneath the bagging film through the vacuum port.

The lay-up mandrel may include vacuum ports flush mounted and connected to a vacuum source. These mandrel vacuum ports are located underneath a porous structural spacer. The vacuum port in such cases usually includes a stiff, perforated insert extending adjacent to the surface of the lay-up mandrel.

When a plurality of vacuum ports are provided, each vacuum port is located underneath the porous structural spacer is inset within the lay-up mandrel, and extends to the surface of the lay-up mandrel. Each vacuum port permits egress of reaction by-products from underneath the bagging film.

A method of forming a composite part includes arranging a composite material on a lay-up mandrel, the composite material having a resin that emits reaction by-products during a curing process. A porous structural spacer is arranged against the composite material, the porous structural spacer having a porous network and defining a structural strength, the porous network being sufficient to allow the flow of the reaction by-products. The composite material is substantially sealed within a bagging film. One or more vacuum ports extend through the bagging film and is located above the composite material. The composite material is cured and vacuum is applied through the vacuum ports for drawing the reaction by-products from underneath the bagging film.

Another method includes arranging a porous structural spacer over a lay-up mandrel, the lay-up mandrel having at least one vacuum port located on the surface. The porous structural spacer contacts the vacuum port, has a porous network, and a structural strength. A composite material is arranged over the porous structural spacer, the composite material having a resin capable of forming reaction by-products during a curing process. The composite material is substantially sealed over the lay-up mandrel with a bagging film. The composite material is cured and vacuum is applied through the vacuum port for drawing the reaction by-products through the porous structural spacer from underneath the bagging film.

BRIEF DESCRIPTION OF THE DRAWINGS

These aspects and many additional advantages of the present invention will become more readily appreciated and better understood by reference to the following detailed description, when taken in conjunction with the accompanying drawings.

DETAILED DESCRIPTION OF THE PREFERRED EMBODIMENT

The present invention provides a porous flexible structural spacer that is placed against uncured composite material, generally prepreg sheets. The porous structural spacer permits egress of by-products from the prepreg sheets without loss of resin and without mark-off from an overlying vacuum port to produce an aerodynamically smooth surface in large structures such as a 20 foot by 30 foot wing skins. Using the porous structural spacer reduces capital costs and recurring fabrication costs. The porous structural spacer is reusable, and allows flexible tooling because the porous structural spacer can serve as one side of the tooling. Larger parts can be made without porosity so that fewer total parts are used in assembly. This reduction in parts also results in fewer joints and fewer fasteners which reduces the weight and simplifies the assembly of the product. The porous structural spacer also provides a smooth surface for the part, which increases aerodynamics and reduces finishing time otherwise required for the part.

Figure 1:
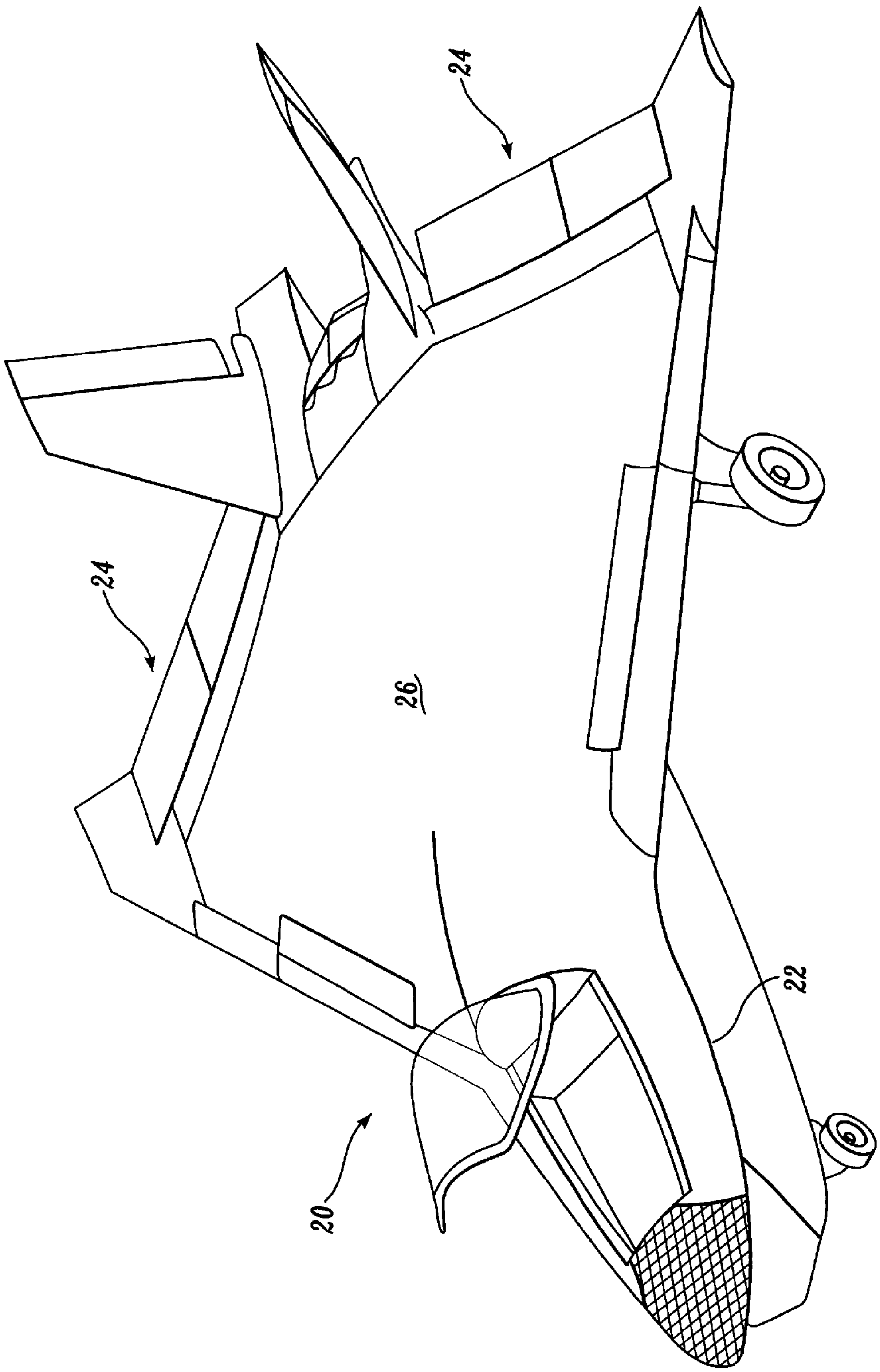
FIG. 1 shows an airplane having a composite wing skin made in accordance with the present invention.
Figure 8:
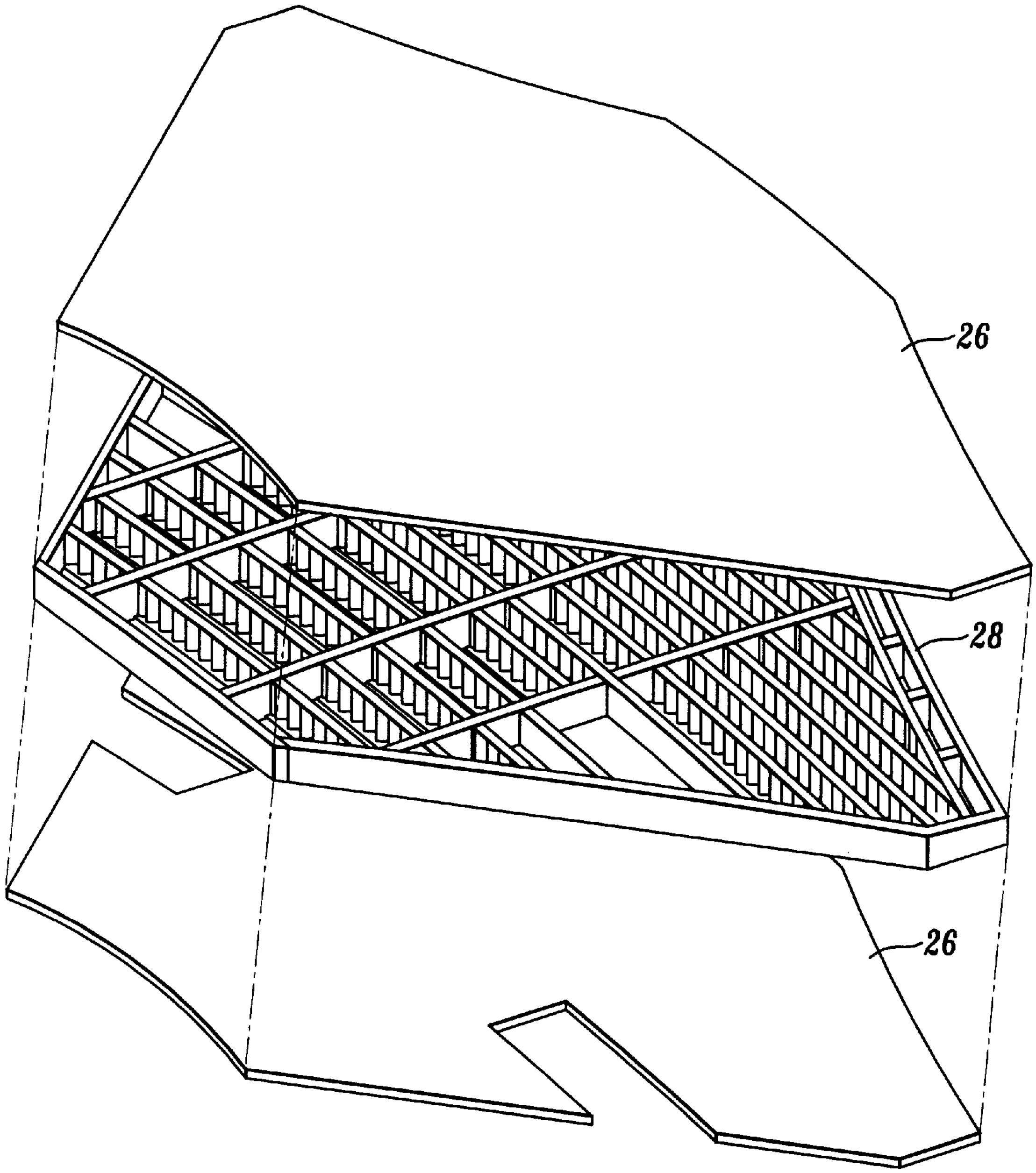
FIG. 8 is an exploded perspective view of the wing for the airplane of FIG. 1.

Referring now to the drawing, in which like reference numerals represent like parts throughout the several views, FIG. 1 illustrates an airplane 20 incorporating parts made in accordance with the method and apparatus of the present invention. The airplane 20 includes a body or fuselage 22 and wings 24. As can be seen in FIG. 8, the wings 24 are formed by wing skins 26 that attach to a frame 28 and that extend the width of the airplane 20.

For ease of reference, the present invention will be described with reference to formation of a fiber-reinforced composite wing skin 26. The present invention is particularly beneficial for forming large composite parts made from volatile-emitting resins, irrespective of the configuration of the parts or their ultimate use.

Figure 2:
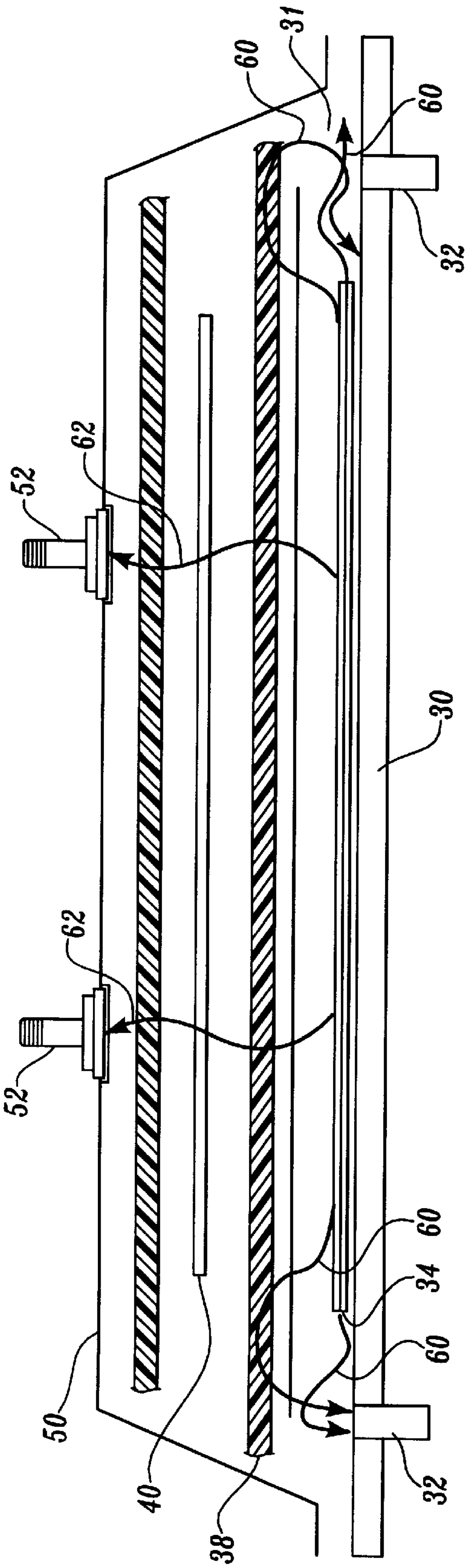
FIG. 2 is a cross-sectional view of a lay-up mandrel for use in the present invention, the lay-up mandrel having a stack of prepreg sheets thereon, and a porous structural spacer arranged over the stack of prepreg sheets.

The wing skin 26 is formed on a lay-up mandrel 30 (shown in FIG. 2). The lay-up mandrel 30 has a forming surface (upper face) 31 formed of a composite or metallic material, such as Invar steel. Preferably, the lay-up mandrel 30 has a coefficient of thermal expansion that is substantially the same as the coefficient of thermal expansion (CTE) of the composite material used to form the wing skin 26 to reduce problems in obtaining the desired shape of a part. Variation in shape often is associated with CTE mismatches.

The upper face 31 of the lay-up mandrel 30 usually has a contour that substantially matches the outer surface of the part being formed, i.e., the wing skin 26. The lay-up mandrel 30 includes internal plumbing (not shown), extending to a number of vacuum ports 32. The vacuum ports 32 until the present invention have been located a few inches outside the perimeter of the part.

The lay-up process on the lay-up mandrel 30 is well known and begins by applying a release agent to the upper face 31 of the lay-up mandrel 30. The release agent covers at least the area of the composite material for the wing skin 26. The release agent, which allows easy removal of the wing skin 26 from the lay-up mandrel 30 after curing, is preferably a fluorinated liquid release agent, but any other suitable release agent or a parting film can be used.

A stack of prepreg sheets 34 are placed over the release agent. The prepreg sheets 34 preferably include interwoven carbon fiber fabric impregnated with a polymer matrix. The polymer matrix is preferably a thermoplastic, such as Avimid® K-3B produced by Cytec. Solvents are added to the polymer matrix to carry the monomer reactants onto the fabric, to control the viscosity of the varnish, and to create a tack similar to conventional thermoset composite prepregs. Although a carbon fiber/thermoplastic composite is preferred, the invention can be used with other composite materials, including thermosetting resins and with unidirectional fibers. The fibers can be fiberglass, silicon carbide, graphite or carbon, or Kevlar®. The present invention has particular relevance, however, to making porosity-free composites from volatile-emitting resins which produce significant by-products during curing, because the method we use allows the by-products to escape.

The layers of prepreg sheets 34 are placed onto the upper face 31 of the lay-up mandrel 30 using hand lay-up procedures, automated tape laying equipment, or other appropriate fabrication methods. After the prepreg sheets 34 are compacted onto the lay-up mandrel 30 (FIG. 2), a parting film 36, preferably Release-Ease® parting film produced by Air-Tech International, is laid over the prepreg sheets 34. The parting film 36 is pressed into place so that a minimum amount of air is trapped under the parting film 36.

A first breather blanket 38 of nylon or fiberglass is placed over the parting film 36 and the vacuum ports 32 outside the part margin. A single porous structural spacer, preferably a fiber metal mesh sheet of sintered metal fibers 40, is laid over the first breather blanket 38 to cover the compacted prepreg sheets 34. An example of a fiber metal mesh sheet is Feltmetal® fiber metal sheets sold by Technetics Corporation. Because the spacer does not degrade at the curing temperature, it is reusable. Feltmetal® fiber metal sheets have randomly interlocked metal fibers sintered to produce metallic bonds at all the points where the fibers touch. The sintering results in a random, three-dimensional, connected structure that has co-continuous metal and a porous network. The co-continuous metal is preferably strong and thick enough to dissipate the curing pressure that is applied to one side of the fiber metal mesh sheet. The continuous porous network permits by-products to flow through the fiber metal sheet even when pressure is applied.

The fiber metal mesh sheet 40 has a bulk or apparent density substantially less than that of the fibrous material itself. The density of the sheet is directly related to the strength of the sheet and its ability to dissipate concentrated forces from a localized area on one side of the sheet to a large area on the opposite side of the sheet. The porosity of the sheet is directly related to the ability of the fiber metal mesh sheet to permit by-products to flow therethrough. Applicants have found that an ideal composition for a fiber metal mesh sheet 40 for use in the method described in connection with FIG. 2 is a stainless steel fiber metal mesh sheet that is 0.04 inches thick and has a weight of 0.79 $lb/ft^2$.

Figure 3:
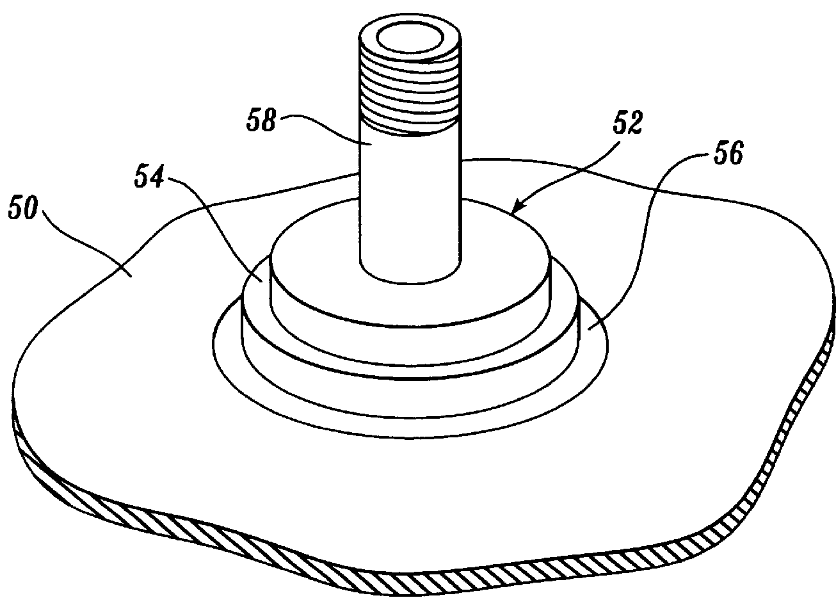
FIG. 3 shows an external vacuum port for use with the lay-up mandrel of FIG. 2.

A second breather blanket 42 generally is placed over the fiber metal mesh sheet 40. A bagging film 50 made of a fluid impervious nylon, Kapton®, or similar products known in the art, is applied over the top of the second breather blanket 42. The bagging film 50 includes a number of external vacuum ports 52. The external vacuum ports 52 include a lower opening that extends through the bagging film 50. A base 54 extends around the opening (FIG. 3) and includes circumferential flange 56 that flares outward at its lower end and which receives thereon the outer perimeter of a hole cut in the bagging film. A threaded cylindrical connector 58 extends axially out of the top of the base 54. The threaded cylindrical connector 58 is designed to receive a vacuum hose that extends to a vacuum source.

The outer edges of the bagging film 50 are sealed to the upper surface of the lay-up mandrel 30 by sealant tape or another suitable method. After the bagging film 50 is sealed to the upper surface of the lay-up mandrel 30, the lay-up mandrel 30 is placed into an autoclave and the internal plumbing of the lay-up mandrel and the external vacuum ports 52 are connected to vacuum hoses. The autoclave is pressurized, vacuum is applied, and the temperature is raised to cure the composite material.

Volatiles that reach the outer edge of the prepreg sheets 34 are withdrawn through the vacuum ports 32, as illustrated with arrows 60 in FIG. 2. The volatiles include the solvent (n-methyl-2-pyrrolidone, "NMP," in the case of K3B), by-products emitted from the monomer reactants or resin, and water produced when the reactants or resin condense during the curing cycle. For K3B, the reaction between the anhydride and amine (or corresponding dicarboxylic acid is controlled by blocking the acid) functionalities with an ethyl ester. When the prepreg sheets are heated, the ester decomposes to yield ethanol and an active carboxylic acid functionality. To produce a composite that is free of porosity, the ethanol must be removed from the consolidated prepreg stack while it cures, which it does by evaporating. So, too, must water be removed that evolves in the imide cyclization reaction. Any air trapped between plies in the prepreg sheet must also be withdrawn. For purposes of this application, we use the term "reaction by-products" to mean any or all of the solvent, organics, water, air, or other gases present in the sheets 34 or produced during their curing that must be removed (generally by evaporating and migrating to a vacuum port) to achieve a composite that is essentially free of porosity. In the case of K3B, the "reaction by-products" are water, NMP, and ethanol. Other resin systems may produce other "reaction by-products."

Curing occurs by heating the prepreg sheets at an elevated pressure generally in an autoclave. For K3B, the curing cycle involves heating the autoclave at about 0.5–1.0° F/min to a dwell temperature of about 665° F. The dwell temperature is held relatively constant (±5° F.) for 2–8 hours to complete the cure. During the heating stage, the aromatic diethyl ester diacid and aromatic diamine in the K3B prepreg sheets emit the ethanol and water first with NMP lingering in the sheets until late in the heating cycle. The prepreg sheets are about 57–65% solids, so a significant volume of "reaction by-products" must be withdrawn to produce a porosity-free composite.

The vacuum draws reaction by-products through the external vacuum ports 52 and through the breather blankets 38 and 42 and the fiber metal mesh sheet 40 (shown by the arrows 62). Preferably, the external vacuum ports 52 are arranged over the entire surface of the prepreg sheets 34 so that the flow path of the reaction by-products from the prepreg sheets 34 to the external vacuum ports (the "mean free flow path") is never greater than 1.5 feet.

Use of the fiber metal mesh sheet 40 increases reaction by-product removal capacity during curing by shortening the by-product removal flow path from the prepreg sheets 34 to the vacuum ports 32, 52. The fiber metal mesh sheet 40 allows placement of external vacuum ports 52 directly over the prepreg sheets 34, facilitating a vast increase in reaction by-product removal capacity and flexibility. Prior to the use of the fiber metal mesh sheet 40, an external vacuum port could not be placed directly on a part surface without creating undesirable indentations (mark-off) on the part. The pressures used to consolidate thermoplastic parts is often on the order of 150–275 psi. Mark-off weakens the structure. It also causes aerodynamic irregularities at the surface of the part.

The fiber metal mesh sheet 40 prevents mark-off by dissipating the localized pressure exerted by the external vacuum ports 52 over the surface of the prepreg sheets 34 while allowing the reaction by-products to escape.

Figure 4:
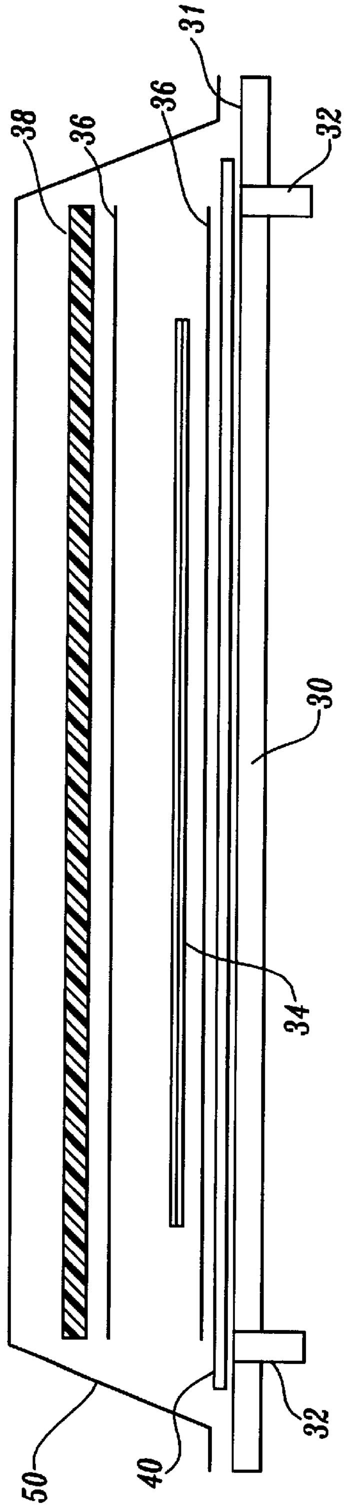
FIG. 4 is a sectional view, similar to FIG. 2, with the porous structural spacer arranged on the lay-up mandrel underneath the stack of prepreg sheets.

FIG. 4 shows an alternative arrangement of the fiber metal mesh sheet 40 and the prepreg sheets 34 where the fiber metal mesh sheet 40 extends over the surface of the lay-up mandrel 30 and over the vacuum ports 32. The arrangement shown in FIG. 4 does not require a bagging film 50 having vacuum ports 52. A parting film 36 is placed over the top of the fiber metal mesh sheet 40 and the prepreg sheets 34 are stacked on the parting film. An additional parting film 36 is placed over the prepreg sheets 34, and a fiber breather blanket 38 is placed over the second parting film.

A bagging film 50 is sealed over the entire structure in the conventional manner. Application of vacuum through the vacuum ports 32 in the mandrel permits the reaction by-products to be drawn out of the prepreg sheets 34 into the fiber metal mesh sheet 40 and along the length and width of the fiber metal mesh sheet and to the vacuum ports.

Figure 5:
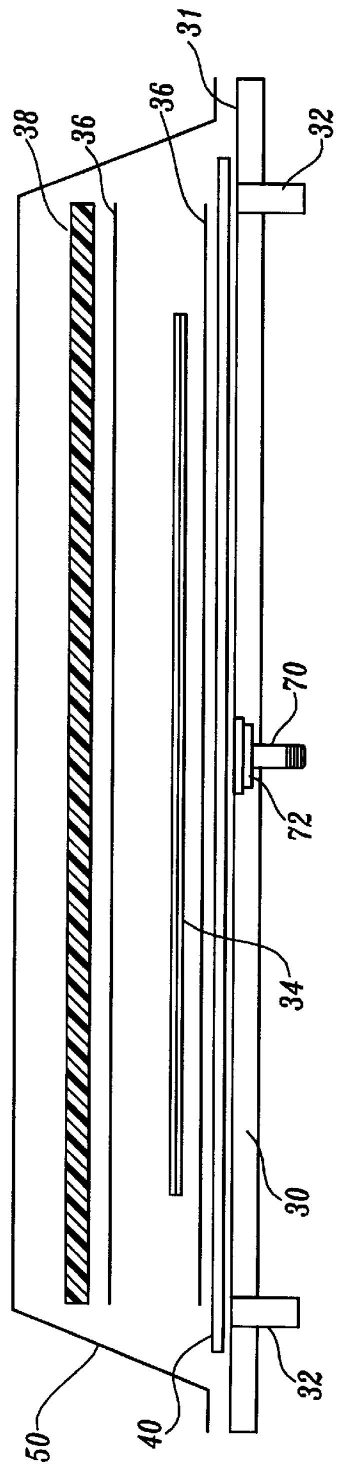
FIG. 5 is another sectional view, similar to FIG. 4, with a vacuum port located underneath the stack of prepreg sheets.

In FIG. 5, at least one vacuum port 70 is provided directly under the prepreg sheets 34. The additional vacuum port 70 includes a stiff, perforated insert 72 that is adjacent to the upper surface of the lay-up mandrel 30. Use of the additional vacuum port 70 under the prepreg sheets 34 shortens the reaction by-product flow path from the portions of prepreg sheets near port 70. In addition, reaction by-products located at the surface of the lay-up mandrel do not have to advance through the stacks of the prepreg sheets 34 to be drawn from the prepreg sheets. In this manner, the use of the additional vacuum port 70 is similar to the use of the external vacuum ports 52 in the bagging film described in connection with FIG. 2. The vacuum ports in the mandrel should be arranged so that the reaction by-product flow path is about 1.5 feet. The stiff perforated insert 72 prevents deflection of the fiber metal mesh sheet 50 at the vacuum port 70, which helps to prevent mark-off of the prepreg sheets 34 by the vacuum port 70.

Figure 6:
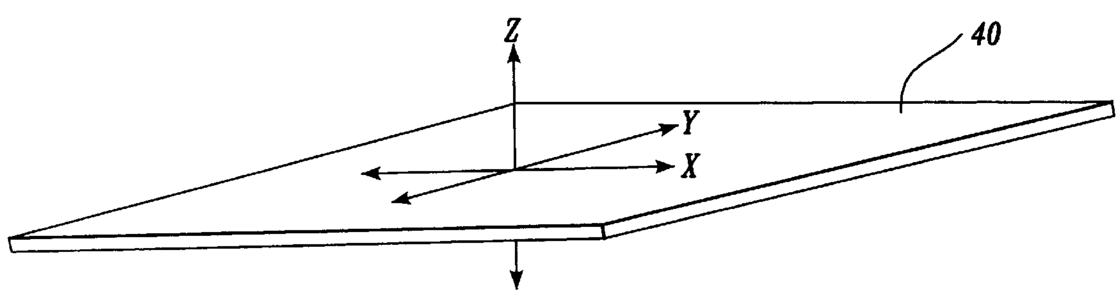
FIG. 6 is schematic diagram showing by-product flow through and then laterally over the porous structural spacer of FIG. 2.

Flow properties of the fiber metal mesh sheet 40 differ through the thickness of the fiber metal mesh sheet (Z direction, FIG. 6), from the flow properties across the surface of the fiber metal mesh sheet (X and Y directions, FIG. 6). The resistance to air flow in the Z direction is typically low. However, the resistance to air flow in the X and Y directions is greater, and, if density is too high, air flow may be insufficient to allow air flow in directions parallel to the surface of the fiber metal mesh sheet. Since resistance to flow in the Z direction is very low compared to the X and Y directions, it is relatively easier for the reaction by-products to travel into or through the fiber metal mesh sheet 40 than parallel to the surface of the fiber metal mesh sheet.

Figure 7:
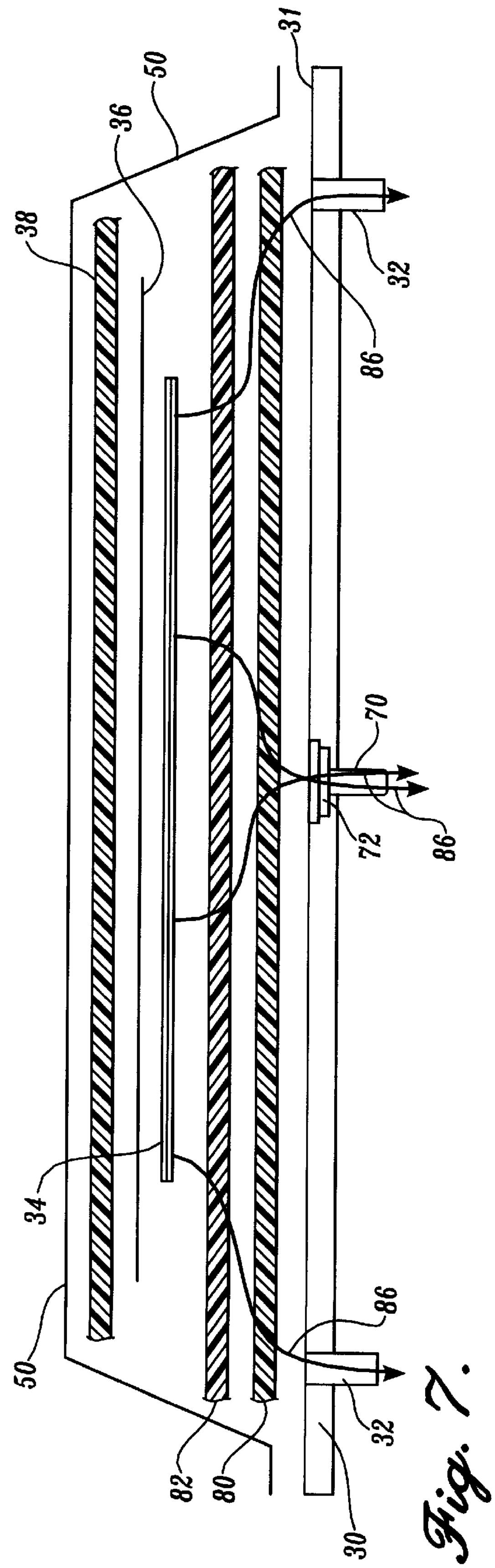
FIG. 7 shows a lay-up mandrel with two porous structural spacers arranged underneath the stack of prepreg sheets.

The arrangement in FIG. 7 takes advantage of these properties of the fiber metal mesh sheets. In FIG. 7, two fiber metal mesh sheets 80, 82 are used with the lay-up mandrel of FIG. 5. As with FIG. 5, an additional optional vacuum port 70 is located underneath the prepreg sheets 34. The first fiber metal mesh sheet 80 is arranged in the same manner as the fiber metal mesh sheet 40 in FIG. 5. The second fiber metal mesh sheet 82 is arranged over the first fiber metal mesh sheet 80. A parting film 36 is arranged on the second fiber metal mesh sheet 82, and the prepreg sheets 34 are stacked on the parting film 36.

The first fiber metal mesh sheet 80 is relatively porous and has good air flow properties, even in the X and Y directions. An example of a product to use for the first fiber metal mesh sheet 80 is Feltmetal® fiber metal sheet Model No. FM125, which is a fiber metal mesh sheet which is 0.04 inches thick and is made of stainless steel and has a weight 0.79 $lb/ft^2$.

The second fiber metal mesh sheet 82 is semi-permeable and preferably has a small pore size (less than 10 microns) which allows reaction by-product flow but inhibits resin flow and has a smooth surface finish. The surface finish of the sheet produces a smooth part surface which does not require sanding or finishing and which improves aerodynamics of the part. In addition, by inhibiting resin flow, the second fiber metal mesh sheet 82 prevents loss of resin from the prepreg sheets 34. Because the second fiber metal mesh sheet 82 has low porosity, the flow properties in the X and Y directions are significantly restrictive when compared to the first fiber metal mesh sheet 80. An example of a product to use for the second fiber metal mesh sheet 80 is Feltmetal® fiber metal sheet Model No. FM1813, which is a fiber metal mesh sheet 0.006 inches thick made of stainless steel and having a weight of 0.62 $lb/ft^2$.

As is shown by the arrows 86 in FIG. 7, during the curing process, reaction by-products produced in the prepreg sheets 34 flow downward out of the surface of the prepreg sheets into and through the second fiber metal mesh sheet 82. Because the resistance to air flow in the X and Y directions for the second fiber metal mesh sheet is great, the reaction by-products generally only flow in the Z direction through the second fiber metal mesh sheet, directly into the first fiber metal mesh sheet 80. Because the resistance to air flow in the X and Y directions in the first fiber metal mesh sheet 80 is relatively low, the reaction by-products are free to flow in the X and Y directions within the first fiber metal mesh sheet 80 and the vacuum ports 32 or 70.

In summary, the second fiber metal mesh sheet 82 does not allow resin to enter its pores, and thereby provides resin containment and produces a good surface finish for the final part. In addition, the second fiber metal mesh sheet 82 is semi-permeable, and allows the reaction by-products to flow into the highly porous first fiber metal mesh sheet 80. The first fiber metal mesh sheet 80 provides a lateral flow path for reaction by-products to the vacuum ports. The stack of two fiber metal mesh sheet 80, 82 can be used under the part as shown in FIG. 7 or over the part, or both. In addition, the two fiber metal mesh sheets 80, 82 can be used in conjunction with the external vacuum ports 52.

Our parts have essentially no porosity, because vacuum ports 52 or the vacuum ports 70 shorten the by-product flow path and provides adequate vacuum pressure over all areas of the prepreg sheets 34 to remove the reaction by-products. The fiber metal mesh sheets provide a porous network for flow of the reaction by-products during the vacuuming process, yet give adequate structure to prevent both mark-off by the vacuum ports 52, 70 and crushing of the porous network as a result of autoclave and vacuum pressure.

While the preferred embodiment of the invention has been illustrated and described with reference to preferred embodiments thereof, it will be appreciated that various changes can be made therein without departing from the spirit and scope of the invention as defined in the appended claims. For example, while the lay-up mandrel of the preferred embodiment is described as having internal vacuum ports 32, the curing process could be performed with only the external vacuum ports 52.

The embodiments of the invention in which an exclusive property or privilege is claimed are defined as follows:

1. An apparatus for use in curing a composite part generally made from a volatile-emitting resin, comprising:

(a) a lay-up mandrel for receiving uncured composite material;

(b) a bagging film substantially overlying over the composite material and sealing around the composite material to define a reaction chamber;

(c) at least one vacuum port in fluid communication with the reaction chamber to permit reaction by-products emitted from the composite material during curing to escape from the reaction chamber; and (d) a porous structural spacer within the reaction chamber between the composite material and the vacuum port, the porous structural spacer having a porous network and sufficient structural strength to allow the flow of the reaction by-products to the vacuum port without causing mark-off, wherein the porous structural spacer includes two mesh sheets of different density and porosity.

2. The apparatus of claim 1, wherein the vacuum port is inset within the lay-up mandrel and extends to the surface of the lay-up mandrel.

3. The apparatus of claim 1, wherein a plurality of vacuum ports are spaced along the top of the composite material so that the maximum by-product flow path to any vacuum port from any portion of the composite material does not exceed approximately 1.5 feet.

4. The apparatus of claim 1, wherein the first metal mesh sheet provides a smooth surface finish on the cured composite material.

5. The apparatus of claim 1, wherein the metal mesh sheet substantially prevents flow of resin material out of the composite material during a curing process.

6. An apparatus for use in curing a composite part, comprising:

(a) a lay-up mandrel;

(b) a porous structural spacer overlying the lay-up mandrel, the porous structural spacer for receiving an uncured volatile-emitting composite material, wherein the porous structural spacer includes two metal mesh sheets of different density and porosity; and (c) a bagging film overlying the porous structural spacer and having at least one vacuum port to permit the flow of volatiles emitted by the composite material through the bagging film, wherein the porous structural spacer prevents mark-off by the vacuum port.

7. The apparatus of claim 6, wherein the at least one vacuum port is inset within the lay-up mandrel and extends to the surface of the lay-up mandrel.

8. The apparatus of claim 7, wherein the vacuum port comprises a stiff, perforated insert extending adjacent to the surface of the lay-up mandrel.

9. The apparatus of claim 6, wherein a plurality of vacuum ports are spaced along the surface of the lay-up mandrel so that the maximum by-product flow path to any vacuum port from any portion of the composite material does not exceed approximately 1.5 feet.

10. The apparatus of claim 6, wherein the first metal mesh sheet provides a smooth surface finish on the cured composite material.

11. The apparatus of claim 6, wherein the metal mesh sheet substantially prevents flow of resin material out of the composite material during a curing process.

12. A method of forming a composite part, generally from a volatile-emitting resin comprising:

arranging a porous structural spacer against a volatile-emitting composite material on a mandrel, the porous structural spacer having a porous network and sufficient structural strength to allow the flow of the reaction by-products to the vacuum port without causing mark-off, wherein the porous structural spacer includes two metal mesh sheets of different density and porosity;

substantially sealing a bagging film over the composite material so as to form a reaction chamber, the reaction chamber having at least one vacuum port for egress of reaction by-products from the reaction chamber; and curing the composite material and applying vacuum through the vacuum port for withdrawing the reaction by-products.

13. The method of claim 12, wherein a plurality of vacuum ports are spaced along the top of the composite material so that the by-product flow path to a vacuum port for all parts of the composite material does not exceed approximately 1.5 feet.

14. The method of claim 12, wherein the vacuum port is located on the surface of the lay-up mandrel in an area under the composite material.

15. A method of removing reaction by-products from resin in a composite part during a curing cycle to a vacuum port overlying the resin without causing mark-off on the part by channeling the reaction-reaction by-products through a porous structural spacer, wherein the porous structural spacer includes two metal mesh sheets of different density and porosity.

16. An apparatus for use in curing a composite part generally made from a volatile-emitting resin, comprising:

(a) a lay-up mandrel for receiving uncured composite material;

(b) a bagging film substantially overlying over the composite material and sealing around the composite material to define a reaction chamber;

(c) at least one vacuum port in fluid communication with the reaction chamber to permit reaction by-products emitted from the composite material during curing to escape from the reaction chamber, the vacuum port located intermediate in the bagging film; and (d) a porous structural spacer within the reaction chamber between the composite material and the vacuum port, the porous structural spacer having a porous network and sufficient structural strength to allow the flow of the reaction by-products to the vacuum port without causing mark-off, wherein the porous structural spacer includes two mesh sheets of different density and porosity.

* * * * *